United States Patent
Meixner

(10) Patent No.: US 8,012,057 B2
(45) Date of Patent: Sep. 6, 2011

(54) DRIVE DEVICE FOR MOTOR VEHICLES

(75) Inventor: Christian Meixner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 552 days.

(21) Appl. No.: 11/596,344

(22) PCT Filed: May 11, 2005

(86) PCT No.: PCT/EP2005/005082
§ 371 (c)(1),
(2), (4) Date: Nov. 14, 2006

(87) PCT Pub. No.: WO2005/110790
PCT Pub. Date: Nov. 24, 2005

(65) Prior Publication Data
US 2007/0249456 A1    Oct. 25, 2007

(30) Foreign Application Priority Data
May 14, 2004    (DE) .......................... 10 2004 024 086

(51) Int. Cl.
*F16H 48/20*    (2006.01)
(52) U.S. Cl. ............ 475/6; 475/150; 475/201; 475/205; 475/221
(58) Field of Classification Search ................. 475/6, 18, 475/19, 21, 29, 149, 150, 153, 221, 230, 475/231, 248, 249, 201, 205; 180/65.6
See application file for complete search history.

(56) References Cited

U.S. PATENT DOCUMENTS

| | | | |
|---|---|---|---|
| 1,519,309 A | 12/1924 | Hummel | |
| 1,984,830 A * | 12/1934 | Higley | 475/21 |
| 1,991,094 A * | 2/1935 | Higley | 74/664 |
| 4,998,591 A * | 3/1991 | Zaunberger | 180/6.44 |
| 5,409,425 A | 4/1995 | Shibahata | |
| 6,024,182 A * | 2/2000 | Hamada et al. | 180/6.28 |
| 6,098,737 A * | 8/2000 | Aoki | 180/242 |
| 6,830,529 B2 * | 12/2004 | Phelan et al. | 475/221 |
| 7,056,252 B2 * | 6/2006 | Gumpoltsberger et al. | 475/6 |
| 7,294,086 B2 * | 11/2007 | Brissenden et al. | 475/231 |
| 7,344,469 B2 * | 3/2008 | Sharma et al. | 475/221 |
| 7,393,296 B2 * | 7/2008 | Kano et al. | 475/5 |
| 2004/0220011 A1 | 11/2004 | Gumpoltsberger et al. | |

FOREIGN PATENT DOCUMENTS

| | | |
|---|---|---|
| DE | 2005 043008 | 5/2005 |
| FR | 2844858 | 3/2004 |
| JP | 06297977 | 10/1994 |
| JP | 2001 039179 | 2/2001 |
| WO | 2004022373 A1 | 3/2004 |

OTHER PUBLICATIONS

International Search Report, PCT/EP2005/005082, Mar. 28, 2008.

* cited by examiner

*Primary Examiner* — Sherry Estremsky
(74) *Attorney, Agent, or Firm* — Novak Druce + Quigg LLP

(57) ABSTRACT

A drive assembly for a motor vehicle generally consisting of a first planetary gear set including a rim gear drivingly connected to an input shaft, a planetary gear carrier mounted on a first output shaft and a sun gear mounted on a second output shaft; a second planetary gear set including a planetary gear carrier mounted on the second output shaft and a planetary gear set drivingly connected to the planetary gear carrier of the first planetary gear set; and a selectively engergizabe electric motor including a rotor mounted on the sun gear of the second planetary gear set.

8 Claims, 5 Drawing Sheets

DRIVE DEVICE FOR MOTOR VEHICLES

The invention relates to a drive device for motor vehicles.

BACKGROUND OF THE INVENTION

Such a drive device is disclosed for example in U.S. Pat. No. 5,910,064 A in which proceeding from a bevel gear differential or a planetary gear differential, the output torques can be shifted to the driven wheels of the motor vehicle to achieve advantages with respect to driving dynamics. Thus, for example for defined adherence conditions of the wheels of the motor vehicle to the roadway, on the wheel on the outside of a curve more driving torque can be transmitted than on the wheel on the inside of the curve, etc. At the same time the agility of the motor vehicle when driving through curves can thus be benefited. To shift the indicated driving torque on both sides of the output shafts there are superposition gears which alternatively shift the torque from one output shaft to the other via hydraulically actuated multi-disk clutches as means of shifting the torque. The multi-disk clutches however cause defined, latent power losses in the drive system.

The object of the invention is to propose a drive device of the generic type which enables torque shifting more effectively and with more structural degrees of freedom and which optionally allows other advantageous driving effects.

SUMMARY OF THE INVENTION

It is proposed that the means for shifting torque from one output shaft to the other is in the form of at least one electric machine which can be operated as an electric motor and as a generator. Thus the power losses caused by clutches are prevented and even faster interventions or torque shifting favorable for driving dynamics is enabled in the drive system. By accelerating or decelerating the electric machine the torque is effectively shifted from one output shaft to the other output shaft and thus adapted to circumstances of driving dynamics.

The electric machine and the superposition gear can be located on one output shaft in a structurally favorable design and thus can transmit the torque for this output torque directly to the corresponding output shaft or indirectly by way of the differential to the other output shaft.

In this connection, the superposition gear can be a single planetary gear set with a sun wheel pivoted on the output shaft and connected to the rotor of the electric machine, with a planet carrier connected to the output shaft, and with an external gear coupled to the planet carrier of the differential which is designed as a double planetary gear set, the other planet carrier acting on the second output shaft. As a rule, the planetary gear set in addition to the aforementioned version with negative stationary gearing can also be made with a positive stationary gearing, in which for example there are for example two respective sun wheels or two hollow wheels.

In an especially advantageous development of the invention there can be at least one other electric machine which can be operated as an electric motor and as a generator, by means of which additional driving torque can be injected directly or indirectly in electric motor operation or electrical energy can be recuperated in generator operation. The two electric machines thus functionally interact such that other advantages in driving dynamics can be achieved; thus additional drive energy can be injected via the second electric machine in heavy acceleration of the motor vehicle or for example energy can be recovered in coasting of the vehicle (recuperation operation).

The other electric machine can be easily mounted on the drive shaft which drives the differential. This can be the universal joint shaft or a differential input shaft or drive shaft in a front configuration of the drive assembly and rear-wheel drive of the vehicle (for example in a longitudinal differential or center differential for all-wheel drive).

Furthermore, the other electric machine with a second superposition gear can be especially advantageously mounted on the second output shaft of the differential. Thus, in addition to the construction combination of functional parts, the result is that by individual triggering of the two electric machines torque shifting can be controlled, while with triggering in the same direction (driving operation or generator operation) output torque intensification or recuperation operation can be made available.

The other superposition gear can be made especially favorably in terms of production engineering as a planetary gear set with a sun wheel connected to the rotor of the electric machine, with a planet carrier connected to the output shaft and with an external gear drive-connected via a countershaft located parallel to the output shafts to the planet carrier of the first superposition gear via gear sets. In addition to a single planetary gear set with negative stationary gearing, fundamentally also a planetary gear set with positive stationary gearing can also be used.

Furthermore, the two electric machines can be located on one output shaft and can be drive-connected to the two output shafts by means of internested planetary gear sets. This enables an especially compact structure of the superposition gear and especially of the electric machines.

In this connection, one electric machine can advantageously act on the sun wheel of a single planetary gear set as one superposition gear, with a planet carrier connected to one output shaft, furthermore the second electric machine can act on the sun wheel of a double planetary gear set as the second superposition gear with a planet carrier which is coupled to the planet carrier of the first planetary gear set, and finally the two common external gears of the planetary gear sets can be drive-connected to the planet carrier of the differential designed as a double planetary gear set.

Alternatively, the differential can be designed as a bevel gear differential with two electric machines on its output shafts, which are drive-connected via the superposition gear which is designed as single planetary gear sets to the corresponding output shafts and the differential case of the bevel gear differential.

In this connection the sun wheel of the planetary gear sets can be connected to the electric machine especially easily in structural terms, while the planet carrier and the external gear are coupled to the differential case and the corresponding output shaft.

As another advantageous alternative, the differential can be a bevel gear differential with output shafts connected to one another via gear sets with a countershaft located parallel to the output shafts, furthermore an electric machine which shifts the torque between the two output shafts being integrated, with a rotor which is drive-connected to one of the indicated shafts and with a quasi-stator drive-connected to one of the gears of the gear sets. Thus a torque can be superimposed on one output shaft or the other via the electric machine and the countershaft, the stator and rotor of the electric machine twisting to one another.

For this purpose the electric machine can preferably be mounted on the countershaft, the rotor of the electric machine being drive-connected directly to the countershaft and its stator being drive-connected to the corresponding gear of the gear sets.

BRIEF DESCRIPTION OF THE DRAWINGS

FIG. 5 shows a drive configuration according to FIG. 4, but with a countershaft which bridges the two output shafts and an electric machine connected in between.

DETAILED DESCRIPTION OF THE PREFERRED EMBODIMENTS OF THE INVENTION

Figure 1:
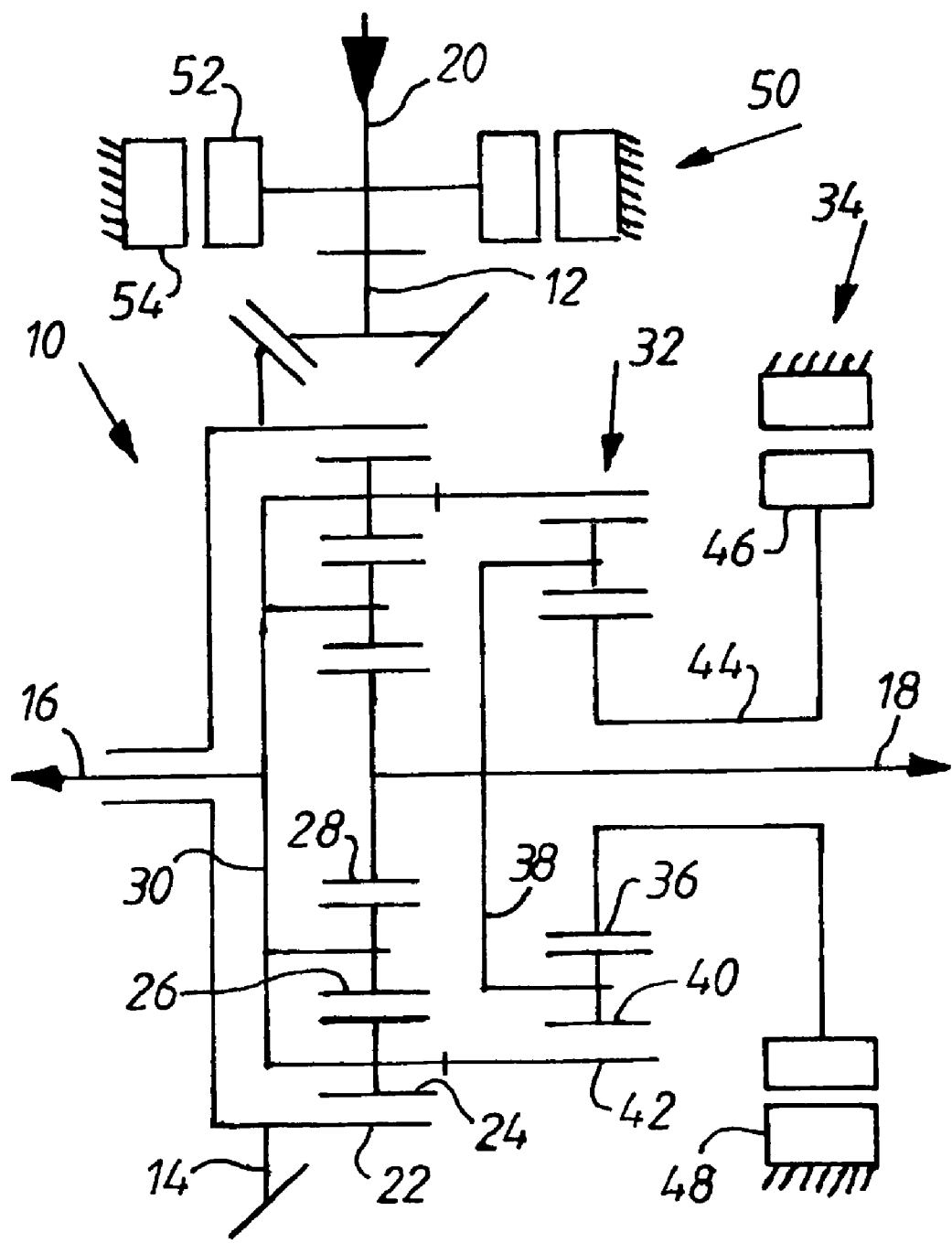
FIG. 1 shows a drive device for motor vehicles with a double planetary gear differential and two electric machines, of which one acts on the drive shaft and the other acts on the output shafts by way of a superposition gear.

The drive device shown as a block diagram according to FIG. 1 has a differential 10 which is designed as a double planetary set and which is driven via a bevel gear drive on an input shaft 12 and a rim gear 14 and which outputs to two output shafts 16, 18.

The differential 10 is a rear axle differential of a motor vehicle which is driven by way of a universal joint shaft 20. The universal joint shaft 20 is connected in the conventional manner to the drive assembly of the motor vehicle which is not shown, for example an internal combustion engine and a variable-speed gearbox. The output shafts 16, 18 are drive-connected via articulated shafts which are not shown to the driven rear wheels of the motor vehicle.

The differential 10 and the double planetary set have an internally toothed external wheel 22 which bears the rim gear 14 and meshes with radially outer planetary gears 24. The planetary gears 24 engage radially inner planetary gears 26 which mesh with a sun wheel 28 on the right output shaft 18. The planetary gears 24, 26 are pivoted on the planet carrier 30. The planet carrier 30 is drive-connected to the left output shaft 16.

Adjacent to the described differential 10 and coaxially to the output shaft 18, there is a superposition gear 32 which as detailed below interacts with the differential 10 and an electric machine 34 which is adjacent to the superposition gear 32.

The superposition gear 32 is designed as a single planetary gear set, with a sun wheel 36, a planet carrier 38 with planetary gears 40 and an internally toothed external gear 42. Fundamentally, instead of a single planetary gear set with negative stationary gearing for the superposition gear 32 a planetary gear set with positive stationary gearing can also conceivably be used, in which among other things two sun wheels or two hollow wheels are used as external gears.

The external gear 42 is securely connected to the planet carrier 30 and the planet carrier 38 is connected to the right output shaft 18 of the differential 10. The sun wheel 36 of the superposition gear 32 conversely is coupled by way of a hollow shaft 44 to the rotor 46 of the electric machine 34, while the stator 48 is located mounted on the housing around the rotor 46.

The electric machine 34 which can be designed as a three-phase synchronous machine of known design, can be accelerated by way of an electronic control which is not shown relative to the output shaft 18, operated as an electric motor, or can be braked, operated as a generator, the output torque on the output shaft 18 being intensified or reduced accordingly. This output torque superposition is transmitted by the superposition gear 32 and the differential 10 based on the illustrated gear connection with the reverse sign to the left output shaft 16; i.e., that with increasing output torque on the output shaft 18 the output torque on the output shaft 16 decreases according to the ratio in the superposition gear 32 and vice versa.

Optionally, acceleration or braking of the electric machine 34 in no-load operation (without output torque control) according to rpm with the output shaft 18 can be indicated in order to preclude unintentional torque shifting based on the mass inertia of the electric machine 34.

In addition to the first electric machine 34, there can be another electric machine 50 on the drive side of the differential 10, for example on the universal joint shaft 20. In this connection the rotor 52 of the electric machine 50 sits directly on the universal joint shaft 20, while the stator 54 is made housing-mounted. The wattage of the electric machine of known design which is optionally made likewise as a three-phase current synchronous machine is designed to be higher than the wattage of the electric machine 34.

The electric machine 50 can optionally make available additional driving power by way of common electronic control with the electric machine 34 operated as an electric motor when the vehicle is accelerating; furthermore the electric machine 50 operated as a generator can produce current in recuperation operation. The current can optionally be used to supply the first electric machine 34 with driving or braking energy.

Figure 2:
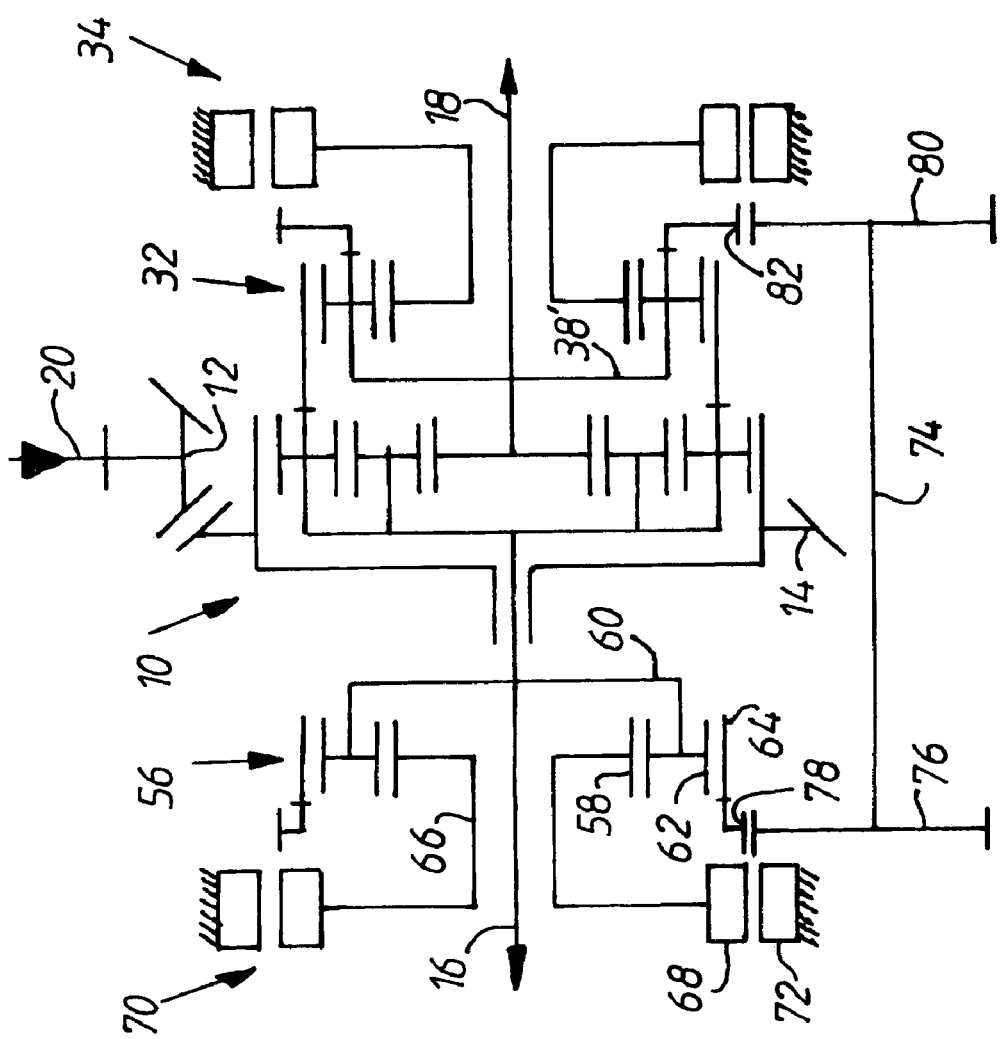
FIG. 2 shows another drive device as shown in FIG. 1, however the two electric machines being located on the two output shafts of the differential.

FIG. 2 shows a modified driving device which is described only to the extent that it differs significantly from FIG. 1. The same parts are provided with the same reference numbers.

In this connection, on the output shaft 16 of the differential 10 and of the double planetary gear set there is another superposition gear 56. The superposition gear 56 with a transmission ratio which is the same in terms of design as the superposition gear 32 is made likewise as a single planetary gear set, with a sun wheel 58, a planet carrier 60 with planetary gears 62 and an internally toothed external gear 64. Here a planetary gear set with positive stationary gearing can also be used for the superposition gear 56.

The planet carrier 60 is drive-connected to the output shaft 16. Furthermore the sun wheel 58 is coupled via a hollow shaft 66 to the rotor 68 of a second electric machine 70 with a stator 72 which is mounted on the housing. The electric machine 70 can be structurally identical to the electric machine 34 on the right output shaft 18.

Furthermore, in the housing of the differential 10 which is not shown, a countershaft 74 is pivoted and is drive-connected to the external gear 64 of the superposition gear 56 and the planet carrier 38' of the superposition gear 32 by way of gear sets 76, 78 and 80, 82.

Output torque shifting can in turn be controlled by opposite or unilateral triggering of the electric machines 34, 70, the left electric machine 70 acting directly on the output shaft 16 by way of the planet carrier 60 and the right electric machine 34 by way of the planet carrier 38' acting directly on the output shaft 18 to intensify the output torque.

By triggering the two electric machines 34, 70 in the same direction, furthermore additional output torque can be superimposed or recuperation operation controlled as by way of the electric machine 50 as shown in FIG. 1. In addition, the two electric machines 34, 70, operated as electric motor then act to drive, or operated as a generator, to generate current or to brake. The countershaft 74 with the gear sets 76, 78, 80, 82 of the same transmission ratio thus ensures synchronous operation of the superposition gears 32, 56.

Figure 3:
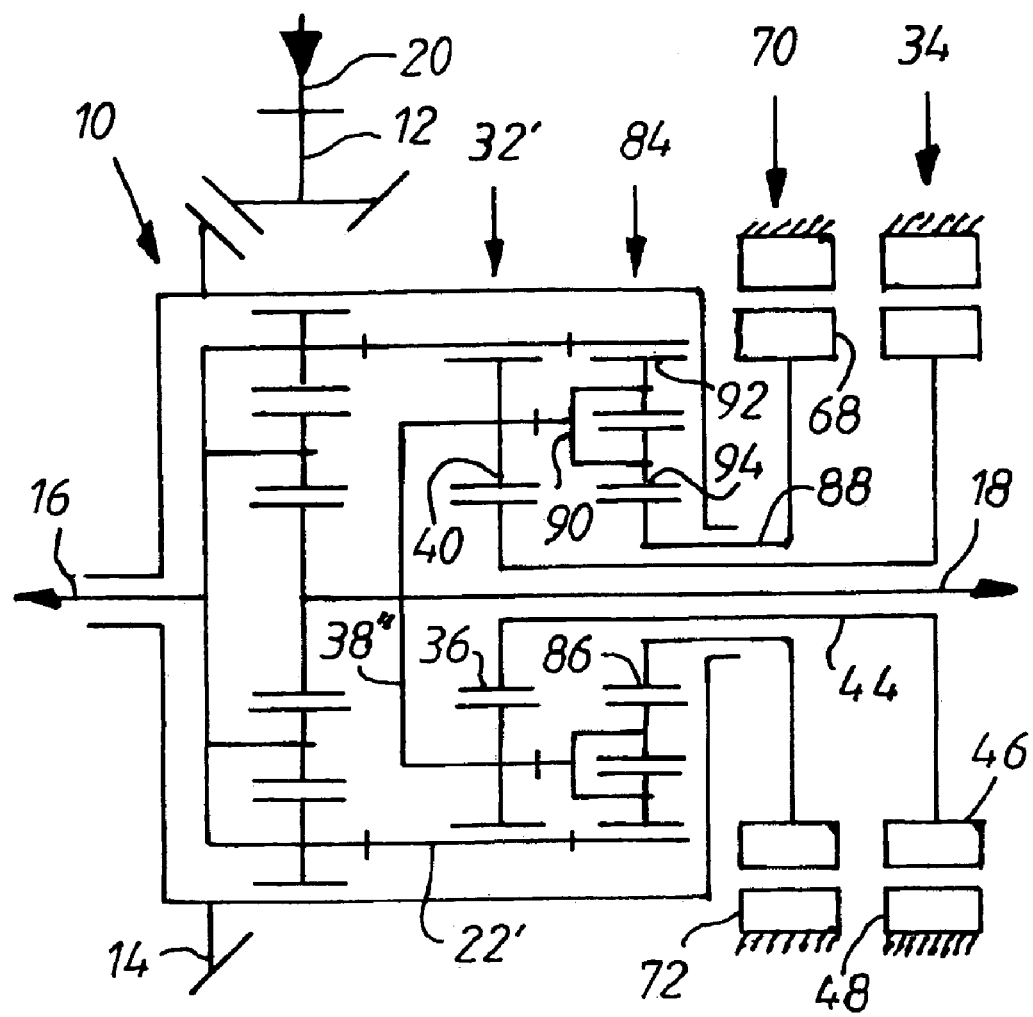
FIG. 3 shows another drive device according to FIG. 1 in which the two electric machines are positioned on one side on the output shaft.

FIG. 3 shows a likewise modified drive device' which in turn is described only to the extent that it differs significantly from FIG. 1 and FIG. 2. The same parts are provided with the same reference numbers.

As shown in FIG. 3, the two electric machines 34, 70 are located on one side on the output shaft 18 and act on the superposition gears 32', 84 which are coupled to one another and which are likewise adjacent to one another.

The superposition gear 32' is made analogously to FIGS. 1 and 2 as a single planetary gear set with a sun wheel 36 which is drive-connected to the rotor 46 of the electric machine 34 by way of a first hollow shaft 44. The planet carrier 38" with the planetary gears 40 is coupled to the output shaft 18. Furthermore the planetary gears 40 mesh with the internally toothed outer wheel 22' of the single planetary set 32' and the planet carrier 30 of the corresponding double planetary gear set 10.

The other adjacent superposition gear 84 is another double planetary gear set which is linked as following in terms of gearing:

The sun wheel 86 is drive-connected to the rotor 68 of the second electric machine 70 via a further hollow shaft 88. The planet carrier 90 is coupled to the planet carrier 38" of the superposition gear 32' and bears radially outer planetary gears 92 and radially inner planetary gears 94 which are pivoted accordingly on the planet carrier 90 and engage one another. The outer planetary gears 92 moreover likewise mesh with the common external gear 22' of the single planetary set 32', while the planetary gears 94 engage the indicated sun wheel 86.

The basic function of the electric machines 34, 70 and the superposition gears 32', 84 is comparable to the operation of the drive device as shown in FIG. 2. The electric machines 34, 70 can thus be used both for shifting the output torque and also as an additional drive source and in recuperation operation with triggering in the same direction.

The superposition gears 32', 84 should in turn be designed quantitatively for the same stationary gearing. The design of the superposition gear 84 as a double planetary gear set is advantageous in order to enable the illustrated internested configuration and linking. Of course, a mirror-identical configuration of the drive device with positioning of the electric machines 34, 70 and the superposition gears 32', 84 which is on the left side in the drawing in FIG. 3 can also be implemented.

Figure 4:
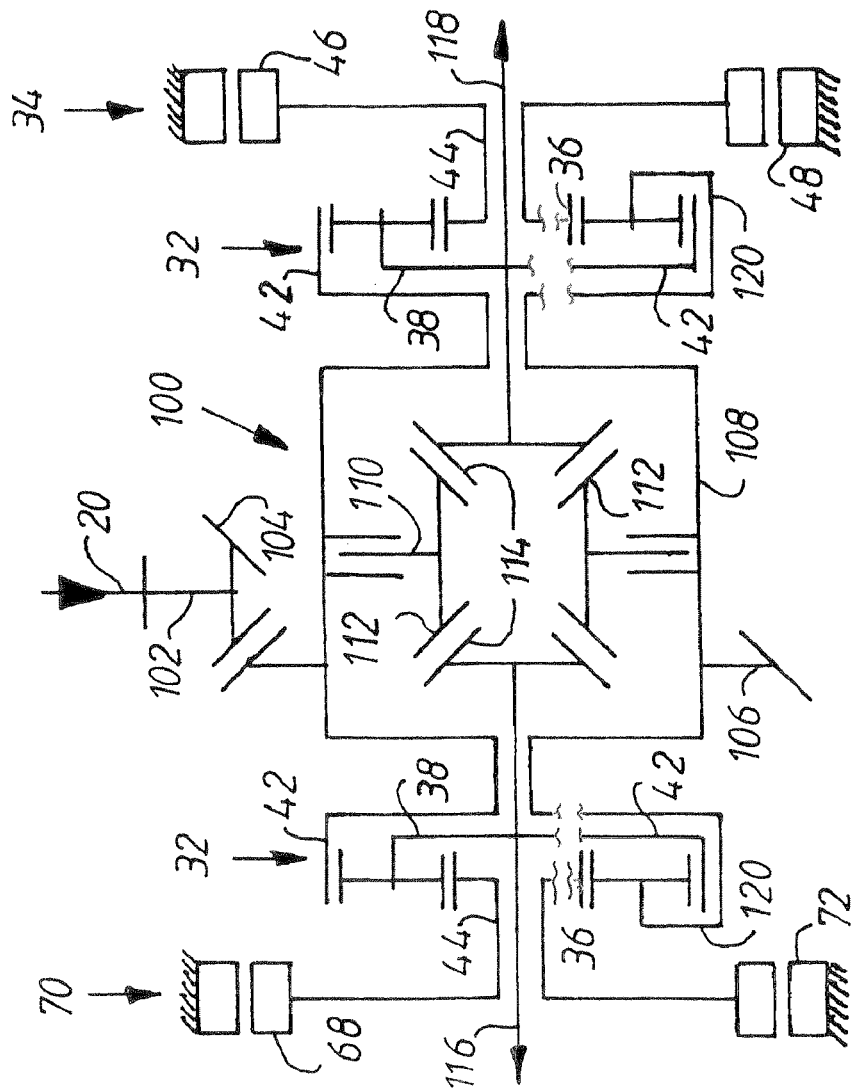
FIG. 4 shows an alternative drive device for motor vehicles with a bevel gear differential and two electric machines with superposition gears on the two output shafts.

FIG. 4 shows in contrast to the above described FIGS. 1 to 3 a bevel gear differential 100 of more or less conventional design which has essentially one input shaft 102 with a driving pinion 104, a rim gear 106 which meshes with the driving pinion 104, a differential casing 108 which bears a rim gear 106, differential bevel gears 112 and axial bevel gears 114 which are pivoted on the driver pin 110 of the differential casing. The axle bevel wheels 114 are connected to the output shafts 116, 118 to transfer torque.

The input shaft 102 is drive-connected to the indicated universal joint shaft 20, while the output shafts 116, 118 are connected to the driven wheels of the motor vehicle by way of articulated shafts which are not shown.

On the output shafts 116, 118 there is one superposition gear 32 designed as a single planetary gear set and an electric machine 34, 70 each, which are coupled to the differential 100 and the output shafts 116, 118 as follows:

At the outset, the sun wheels 36 are connected to the rotors 46, 68 of the electric machines 34, 70 by way of the hollow shafts 44. The planet carriers 38 and 120 (compare top and bottom half of the drawings in FIG. 4) can alternatively be coupled to the differential casing 108 of the differential 100 or to the output shafts 116, 118. The same applies to the external gears 42 which can then be alternatively connected to the output shafts 116, 118 or to the differential case 108. It goes without saying that the same version should be selected for reasons of identical parts for the two superposition gears 32.

The function of the drive device shown in FIG. 4 is identical to the triggering described for FIG. 2 with respect to triggering of the electric machines 34, 70. Shifting of the output torque can be controlled by individual or opposite triggering and additional output torque intensification or recuperation operation caused the electric machines 34; 70 can be controlled by triggering in the same direction.

Figure 5:
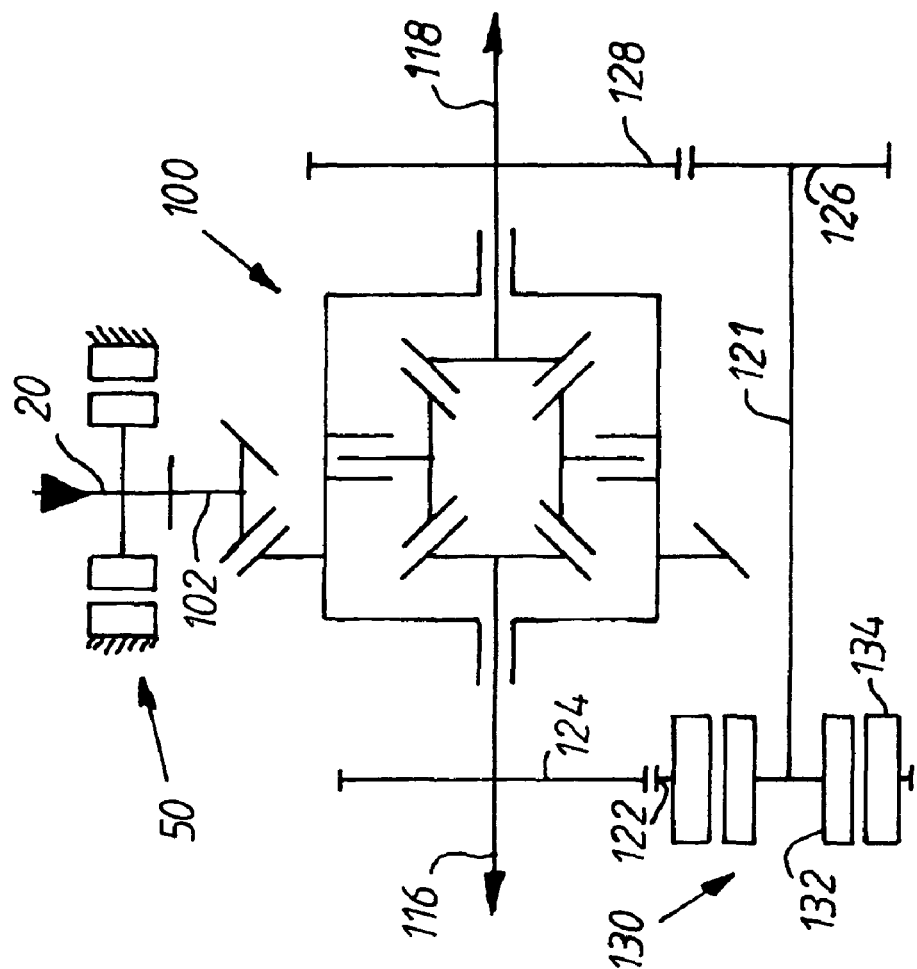

In FIG. 5 in turn the same parts are provided with the same reference numbers. The description is limited to the differences which are significant relative to FIGS. 1 to 4.

As is to be seen in FIG. 5, the electric machine 50 is in turn connected upstream of the differential 100, with the function of the additional output torque feed described for FIG. 1 when the vehicle is accelerating and in recuperation operation.

To shift the output torque between the output shafts 116, 118 a countershaft 121 is pivoted parallel to the output shafts 116, 118 in the housing of the differential 100 which is not shown and which is coupled to the output shafts 116, 118 by way of gear sets 122, 124, and 126, 128 with an unequal transmission ratio.

Between the gear 122 and countershaft 121 an electric machine 130 is connected, with a rotor 132 which is drive-integrated into the gear 122 with the countershaft 121 and its quasi-stator 134, and forms a functional unit with it.

Due to the unequal transmission ratio between the gear sets 122, 124, and 126, 128, in the operation of the motor vehicle or when the output shafts 116, 118 between the rotor 132 and the stator 134 are turning, relative rotation occurs which causes a shift of the output torque to one output shaft or the other 116, 118 by corresponding triggering of the electric machine 130 as an electric motor or as a generator.

The invention is not limited to the illustrated embodiments. Thus combinations of the versions shown in the individual FIGS. 1 to 5 can also be advantageous depending on the specific circumstances.

Instead of the use of the drive device on the rear axle of the motor vehicle, it can also be used or used in addition on the front axle. Furthermore the differential can also be a center differential for all wheel drive of the motor vehicle (longitudinal differential), then the indicated output shafts being drive-connected to the front axle differential and the rear axle differential, and the differential input shaft not being connected to the universal joint shaft, but to the drive shaft of the variable-speed gearbox or to an intermediate shaft (for example, transaxte principle).

The invention claimed is:

1. A drive assembly for a motor vehicle, comprising:
   a first planetary gear set including a rim gear drivingly connected to an input shaft, a planetary gear carrier mounted on a first output shaft and a sun gear mounted on a second output shaft;
   a second planetary gear set including a planetary gear carrier mounted on said second output shaft and a planetary gear set drivingly connected to an internal gear of said planetary gear carrier of said first planetary gear set; and
   a selectively energizeable electric motor including a rotor mounted on a sun gear of said second planetary gear set.

2. A drive assembly according to claim 1 wherein said first planetary gear set includes inner and outer planetary gear sets.

3. A drive assembly according to claim 1 including a second selectively energizeable electric motor including a rotor mounted on said input shaft.

4. A drive assembly according to claim 1 including a third planetary gear set including a planetary gear carrier mounted on said second output shaft, a second selectively energizeable electric motor having a rotor mounted on the sun gear of said third planetary gear set and means operatively interconnecting said planetary gear set carrier of said second planetary gear set and said planetary gear carrier of said third planetary gear set, for transmitting rotary drive therebetween.

5. A drive assembly according to claim 1 including a third planetary gear set including a planetary gear carrier supported on said second output shaft, and a second selectively energizeable electric motor having a rotor mounted on the a gear of said third planetary gear set.

6. A drive assembly comprising:
   a beveled gear differential including a housing rotatable about an axis and drivingly connectable to an input shaft, and a pair of output shafts disposed coaxially with respect to said differential housing;
   a countershaft disposed parallel to said axis and drivingly connected to said output shafts through gear connections; and
   a selectively energizeable electric motor having a rotor coaxially disposed on a gear portion mounted on said countershaft for rotation therewith and a stator coaxially disposed on a gear portion meshing with a gear mounted on one of said output shafts.

7. A drive assembly according to claim 6 including a second, selectively energizeable electric motor having a rotor coaxially disposed on said input shaft.

8. A drive assembly for a motor vehicle comprising:
   a beveled gear differential including a housing rotatable about an axis and drivingly connectable to an input shaft, and a pair of output shafts disposed coaxially with respect to said differential housing; and
   a pair of planetary gear sets,
   wherein each of said planetary gear sets includes a sun gear disposed coaxially relative to one of said output shafts and connected to a rotor of an electric motor, a ring gear disposed coaxially relative to said one output shaft and connected and rotatable with one of said differential housing and said one output shaft, and a planetary gear carrier disposed coaxially relative to said one output shaft and connected to and rotatable with the other of said differential housing and said one output shaft.

* * * * *